(12) United States Patent  (10) Patent No.: US 7,785,042 B2
Scandaliato  (45) Date of Patent: Aug. 31, 2010

(54) DOUBLE-WALL PROTECTION LEVEE SYSTEM

(76) Inventor: Samuel Zengel Scandaliato, 616 Browne St., Suite 302, New Orleans, LA (US) 70113

(*) Notice: Subject to any disclaimer, the term of this patent is extended or adjusted under 35 U.S.C. 154(b) by 56 days.

(21) Appl. No.: 11/439,639

(22) Filed: May 24, 2006

(65) Prior Publication Data

US 2007/0274786 A1   Nov. 29, 2007

(51) Int. Cl.
    *E02D 5/02*   (2006.01)
(52) U.S. Cl. .................. 405/285; 405/284; 405/286
(58) Field of Classification Search ........... 405/262, 405/284, 285, 286, 110, 111, 112
    See application file for complete search history.

(56) References Cited

U.S. PATENT DOCUMENTS

| 738,346 | A | * | 9/1903 | Mouchel | 405/284 |
| 1,693,311 | A | * | 11/1928 | Miller et al. | 405/285 |
| 4,290,246 | A | * | 9/1981 | Hilsey | 52/169.1 |

FOREIGN PATENT DOCUMENTS

| JP | 2002-004240 | * | 9/2002 |
| JP | 2003-253644 | * | 9/2003 |

* cited by examiner

*Primary Examiner*—David J Bagnell
*Assistant Examiner*—Sean D Andrish
(74) *Attorney, Agent, or Firm*—Juan J. Lizarraga

(57) ABSTRACT

A double-wall protection levee floodwall has a pair of piles placed into soil at the bank at the edge of a water body or formed by a levee. The piles of the pair are oriented parallel to each other, are spaced apart transversely, and are rigidly connected together by a connector so that when the force of rising water or a water-borne object is applied to a face of one of the piles, a force couple develops that places one of the piles in tension and the other pile of the pair in compression. The distance between the force-coupled piles and the depth of the piles in the soil provide the ability to withstand predetermined transverse forces while conserving materials and space. Fill material, riprap, earthen support, and erosion control matting can improve the function of the double-wall floodwall. Multiple pairs of piles can be longitudinally placed to form a continuous floodwall.

19 Claims, 2 Drawing Sheets

DOUBLE-WALL PROTECTION LEVEE SYSTEM

CROSS-REFERENCE TO RELATED APPLICATIONS

None

STATEMENT REGARDING FEDERALLY SPONSORED RESEARCH

None

NAMES OF PARTIES TO A JOINT RESEARCH AGREEMENT

None

REFERENCE TO A "SEQUENCE LISTING"

None

BACKGROUND OF THE INVENTION

1. Field of the Invention

The invention relates to flood control systems and apparatus and, more particularly, to a method of using coupled piles to form a flood barrier, a system embodying the method, and apparatus for use in the method and system.

2. Description of Related Art, Including Information Disclosed Under 37 CFR 1.97 and 37 CFR 1.98

The effect of normal compaction of alluvial soil over time is exacerbated by river levees that prevent the seasonal deposit of new sediment and by extraction of subsurface minerals, particularly oil. Coastal wetland erosion, whether due to salt-water intrusion resulting from man-made canals and waterways or to a failure to replenish wetland soils after subsidence, provides a channel or at least a shorter path for storm surges to reach inland and reduces storm-surge protection afforded by coastal wetlands, which would otherwise dissipate some of the energy of a storm surge and consequently reduce the height of the surge. Floodwalls and levees are increasingly necessary to form a barrier against rising water due to storm surges, tidal action, and high river stages. Flooding that is a consequence of the failure of a levee or floodwall, particularly during storm surges onto low-lying coastal areas that are below sea level, can be catastrophic.

In developed areas, the dislocation of existing infrastructure may be undesirable and the cost of obtaining rights-of-way may become prohibitive. In such developed areas, floodwalls are used, either in conjunction with small earthen levees or as an alternative to earthen levees.

Typically, floodwalls comprise a series of sheet metal piles that are driven into the ground with a portion of each pile projecting above the ground. Conventionally, the sheet metal piles are abutted, overlapped, or connected longitudinally to form a single-layer wall Single-layer piles obtain strength to resist transverse movement based on the depth of insertion into the soil and the horizontal resistance of the soil in which the piles are placed. Peaty and relatively noncompacted soils require piles to be inserted to substantial depths to increase the horizontal resistance of these soils. Some of the floodwall failures in New Orleans during Hurricane Katrina were the result of a combination of inadequate soil resistance and piles that were too short and were consequently driven too shallowly under the circumstances.

Increasing the protection afforded by floodwalls in existing developed areas, particularly in New Orleans and surrounding areas, requires stronger floodwalls. Given the poor soil conditions in the area, simply increasing the length of the sheet metal piles may not be allow the strength of the floodwalls to be increased to the level of protection desired. Consequently, a new method of providing floodwalls, and a new system and apparatus for floodwall protection, is desirable. Accordingly, it is an object of the present invention to provide a new and more effective method for creating floodwalls in limited areas and a new floodwall and levee system and apparatus, for use where available rights-of-way are limited, that are stronger than conventional floodwalls. It is also an object of the present invention to provide a new method and a new system and apparatus that is more cost efficient than conventional methods, systems, and apparatus. Finally, it is an object of the present invention to provide a method of reinforcing or strengthening existing, single-wall floodwalls.

BRIEF SUMMARY OF THE INVENTION

The flood control system, apparatus, and method according to the present invention include a pair of piles driven or otherwise placed into soil at or near an edge of an area to be protected from rising water, the piles in the pair being spaced apart transversely and being oriented substantially parallel to each other; and means for connecting together the piles in the pair to develop, when an external force is applied to a face of one of the piles, a force couple that places one of the piles in tension and the other pile in compression. Each pile comprises material or materials taken from the group consisting of steel, sheet metal, wood, plastic, polymer, and concrete. The distance between the piles in the pair and the depth of the piles in the soil are selected to provide the ability to withstand predetermined transverse forces while conserving materials and space. The distance between piles in the pair can be between approximately three feet and approximately twenty feet. As a rule of thumb, when the bottom slope of the waterway is horizontal (that is, substantially flat), the depth of insertion of the inner pile (also called the "tension" pile) into the soil is preferably approximately two-thirds of the total length of the pile. Also as a rule of thumb, where the bottom of the waterway has a slope, the depth of insertion of the inner pile should be somewhat more than two-thirds of the total length of the inner pile to account for the increased depth of the waterway. Of course, specific calculations based on soil data can change the total length needed for the piles and can alter the amount of needed penetration into the ground. The system and apparatus according to the invention can be used in combination with an earthen levee, but the inner pile must extend below the toe of any levee.

The means for connecting the piles in a pair is preferably a rigid cap at the top of the piles. The cap can be concrete or can be a strut, either a steel beam or a steel pipe or tube. The cap preferably has an upper surface that is adapted for use as a roadway or a bicycle trail, or a pedestrian pathway. Fill material is preferably placed in the space between the piles in the pair, the fill material being selected to strengthen the pair of piles to help absorb and redistribute the force of any impact from a rapid surge and to resist transverse movement when a horizontal force is applied perpendicularly to the outer face of the inner pile. The fill material can be any granular or otherwise compactable material, and is preferably either sand or limestone gravel.

Riprap is preferably placed adjacent to an outside face of one of the piles of the pair to protect against scour from tidal movement and/or from pumping operations. An earthen support is preferably placed adjacent to an outside face of one of the piles in the pair, for strengthening the pair of piles to resist transverse movement of the piles in the pair. Erosion control matting can be placed over the earthen support to help prevent erosion in case the floodwalls are overtopped.

Preferably, multiple pairs of piles are longitudinally abutted, overlapped, welded, bolted, or interlocked to form a continuous floodwall. Alternatively, where a single-wall floodwall already exists, piles can be added, on either side of the existing floodwall, and connected the existing floodwall to create a force couple to strengthen the existing floodwall by creating a double-walled floodwall.

The apparatus according to the invention comprises a pair of piles, the piles in the pair being spaced apart transversely and being oriented substantially parallel to each other. The piles in the pair are connected together to develop, when an external force is applied to a face of one of the piles, a force couple that places one of the piles in tension and the other pile in compression when the connected piles are in place in a floodwall. The piles in the pair are preferably connected together at or near their tops to help develop the force couple. Some passive resistance of the soil to transverse movement is also developed.

The method of protecting against flooding due to rising water according to the invention includes driving or placing a pair of piles into soil at or near an edge of an area to be protected from rising water so that a portion of the pair of piles extends above the surface of the soil to a height at least equal to the maximum anticipated height of the water. The piles in the pair are spaced apart transversely and are oriented substantially parallel to each other. The piles in a pair are connected together, preferably near or at the top of the piles, to develop, when an external force is applied to an outer face of the inner pile, a force couple that places one of the piles in tension and the other pile in compression, thereby using the cohesion of the soil to reduce transverse movement over what would occur with a single-layer pile.

The space between the piles in the pair is preferably filled with material that further increases the resistance of the connected pair of piles to transverse movement. Riprap is preferably placed adjacent to an outside face of one of the piles along the bottom of the waterway to protect against scour from tidal movement and/or from pumping operations. An earthen support is preferably placed adjacent to an outside face of one of the piles in the pair, for strengthening the pair of piles to resist transverse movement. Erosion control matting can be placed over the earthen support to help prevent erosion in case the floodwall is overtopped.

Accordingly, it is an object of the present invention to provide a new and more effective method for creating floodwalls in size-limited areas and to provide a new floodwall and levee system and apparatus, for use in size-limited areas, that are stronger than conventional single-layer floodwalls. It is also an object of the present invention to provide a new method and a new system and apparatus that is more cost efficient than conventional methods, systems, and apparatus. These and other objects and advantages are apparent from the description of the invention, taken in conjunction with the drawing, can be learned by practice of the invention, or are apparent to a person of ordinary skill in the art of floodwall and levee design.

DETAILED DESCRIPTION OF THE INVENTION

Figure 1:
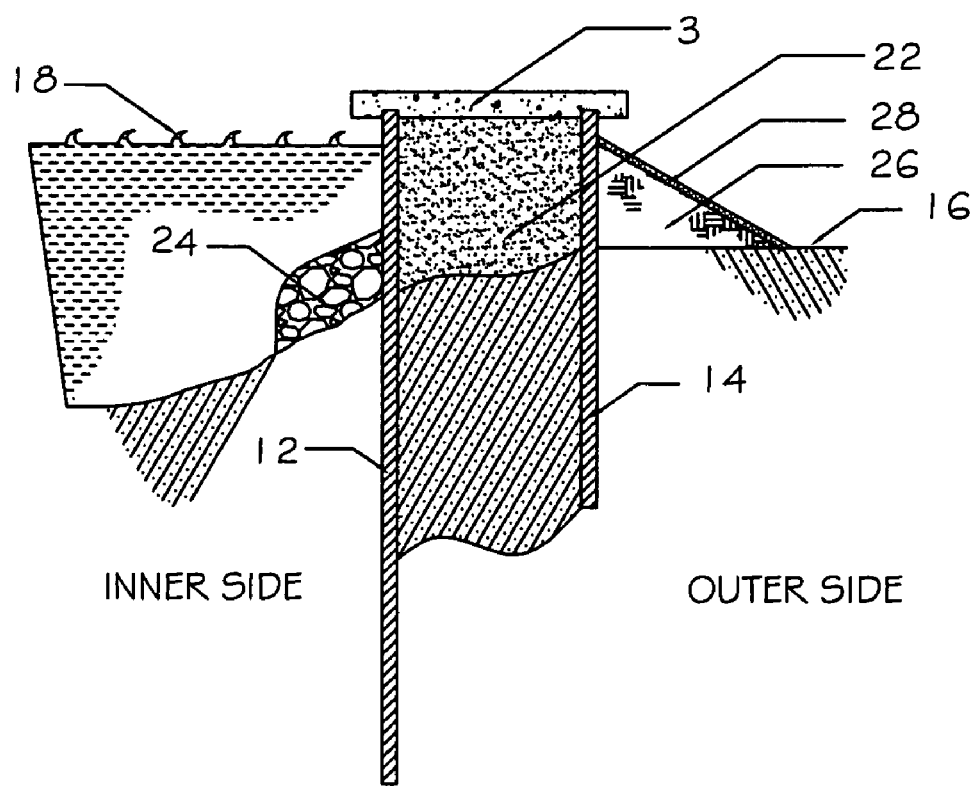
FIG. 1 is a cross section elevation of an embodiment of the inventive double-wall protection levee.

A pair of piles, inner pile 12, also referred to as tension pile 12, and outer pile 14, also referred to as compression pile 14, are substantially flat, sheet-type piles. Piles 12 and 14 are placed, preferably by driving, into natural ground 16 at the bank of water body 18 (shown as a canal) or, alternatively, into a levee at the bank of a water body. Piles 12 and 14 are preferably made of sheet steel, but they can also be made of wood, plastic, concrete, or a polymer. Pairs of piles 12 and 14 are oriented with broad, sheet faces parallel to each other and are positioned transversely, that is they are separated by approximately three feet to approximately twenty feet.

Figure 2:
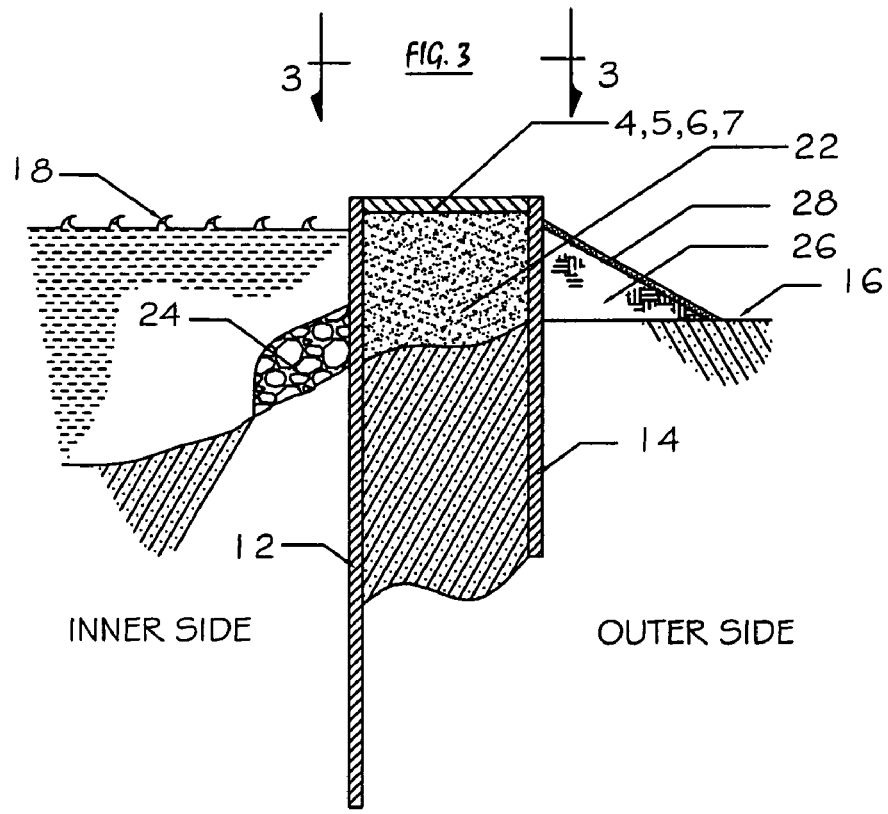
FIG. 2 is a cross section elevation of an alternate embodiment of the inventive double-wall protection levee.
Figure 3:
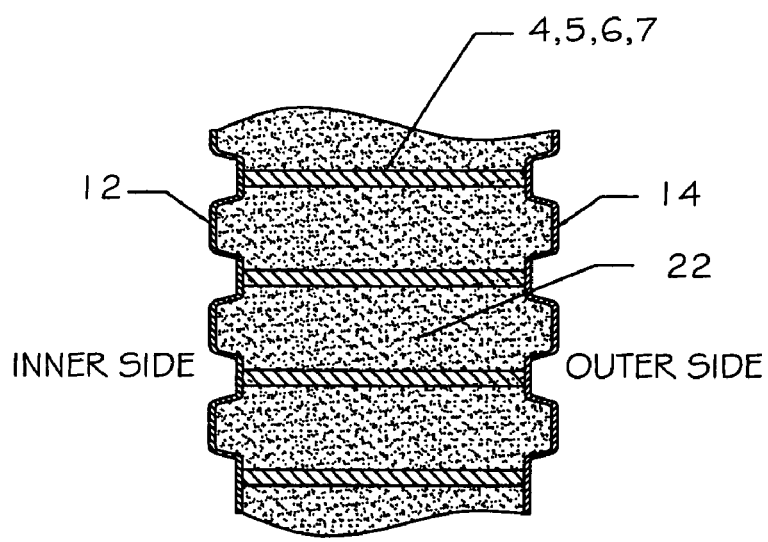
FIG. 3 is a horizontal cross section of an alternate embodiment of the inventive double-wall protection levee taken in the direction of Arrows 3-3.

As shown in FIG. 1, piles 12 and 14 are rigidly connected together by a connector, preferably reinforced concrete cap 3. In the alternative embodiment depicted in FIGS. 2 and 3, strut 4, either steel beam 5 or steel pipe 6 or tube 7 can be used to connect piles 12 and 14 together. The connector preferably has an upper surface that is adapted for use as a roadway, a bicycle path, a pedestrian pathway, or the like. The rigidly connected pile pair develops a force couple that places inner pile 12 in tension and outer pile 14 in compression when an external force is applied to the outer face of inner pile 12. The force couple utilizes the cohesion (skin friction) of the soil (earth) to the pile to increase the resistance of the rigidly connected pile pair to transverse movement due to the outer face of inner pile 12.

In one embodiment of a floodwall according to the invention, fill material 22, preferably sand or limestone gravel, is placed in the space between piles 12 and 14 in the pair, the fill material being selected to strengthen the pair of piles to help absorb and redistribute the force of any impact from a rapid surge as well as to resist transverse movement when a horizontal force is applied perpendicularly to the outer face of the inner pile. The fill material can be any granular or otherwise compactable material, including rock gravel or concrete gravel.

Riprap 24 can be placed at the bottom of a waterway adjacent to an outside face of inner pile 12 of the pair to protect against scour of the water bottom from tidal movement and/or from pumping operations. Earthen support 26, such as earth fill, can be placed adjacent to an outside face of one of the piles in the pair, for strengthening the pair of piles to resist transverse movement of the piles in the pair. Erosion control matting 28 can be placed over earthen support 26.

The method of protecting against flooding due to rising water according to the invention includes driving or placing a pair of piles into soil at or near an edge of an area to be protected from rising water and water-borne debris so that a portion of the pair of piles extends above the surface of the soil to a height at least equal to the maximum anticipated height of the water. Inner pile 12 is, as a rule of thumb, inserted into the ground 16 or into a levee to a depth of approximately two-thirds of the length of inner pile 12, and deeper if the water body has a bottom slope. Outer pile 14 is, as a rule of thumb, placed into ground 16 to approximately one-half of the depth of inner pile 12. The preference is for the water-side pile to be driven or inserted to a greater depth than the land-side pile, but the relative depth of the piles could be reversed if necessary or desired. It will be apparent to a person of ordinary skill that calculations based on specific soil data can change the total length needed for the piles and can alter the depths of penetration of the piles, as well as the relative depth of penetration as between pairs of piles. In any event one of the piles, preferably the inner pile, must extend below the sheer plane of the levee or soil in which the pile is placed.

The piles in the pair are connected together, preferably near or at the top of the piles, to develop, when an external force is applied to an outer face of the inner pile, a force couple that places one of the piles in tension and the other pile in compression, thereby using the cohesion of the soil to reduce transverse movement over what would occur with a single-layer pile for the same applied force. Some horizontal passive resistance to transverse movement can be anticipated.

Preferably, multiple pairs of piles are longitudinally abutted, overlapped, welded, bolted, or interlocked to form a continuous floodwall.

The disclosed embodiments of the apparatus, system, and method according to the invention are illustrative of the scope of the invention, which is recited in the appended claims. Various modifications of the disclosed embodiments can be made or are apparent from the description contained herein, without departing from the scope of the invention as claimed.

The invention claimed is:

1. A system for providing flood protection, the system comprising:
a continuous double-walled floodwall of multiple pairs of substantially flat, sheet-type water-side inner and land-side outer piles with broad sheet faces of each pair parallel to each other and top and bottom ends, bottom ends driven or otherwise placed into the natural ground or soil at or near an edge of an area to be protected from rising water, storm surges, and/or impacts from floating objects, the substantially flat, sheet-type inner and outer piles in the multiple pairs being spaced apart transversely and being oriented with the broad sheet faces of each pair parallel to each other, with the top ends of the inner and outer piles extending above the natural ground or soil to a height at least equal to the maximum anticipated height of the water, with the bottom end of the inner pile driven deeper into the natural ground or soil than the bottom end of the outer pile, the inner pile being supported solely by the cohesion of the soil, and means for rigidly connecting the inner and outer piles of each pair at their top ends to develop, when an external force is applied to the broad sheet face of the water-side inner substantially flat, sheet-type piles of one of said multiple pairs, a force couple that places the water-side inner substantially flat, sheet-type pile of said one of said multiple pairs in tension against the cohesion of the soil and the other land-side outer substantially flat, sheet-type pile of said one of said multiple pairs in compression against the soil.

2. The system according to claim 1, wherein each substantially flat, sheet-type pile of said one of said multiple pairs comprises material taken from the group consisting of steel, sheet metal, wood, plastic, polymer, and concrete.

3. The system according to claim 1, wherein the distance between the substantially flat, sheet-type piles of said one of said multiple pairs and the depths of the substantially flat, sheet-type piles of said one of said multiple pairs in the soil are selected to provide the ability to withstand predetermined transverse forces while conserving materials and space.

4. The system according to claim 1, wherein the rigidly connecting means comprises a rigid cap.

5. The system according to claim 4, wherein the rigid cap consists of concrete.

6. The system according to claim 4, wherein the rigid cap has an upper surface adapted for use as a roadway, a bicycle path, and/or a running/jogging/walking path.

7. The system according to claim 1, wherein the rigidly connecting means comprises a strut.

8. The system according to claim 7, wherein the strut consists of a steel beam.

9. The system according to claim 7, wherein the strut consists of a rigid pipe or tube.

10. The system according to claim 1, further comprising: fill material placed in the space between the substantially flat, sheet-type piles of each of said multiple pairs, the fill material being selected to strengthen the substantially flat, sheet-type piles of each of said multiple pairs flat, sheet-type piles said multiple pairs to resist transverse movement when a horizontal force is applied perpendicularly to the sheet face of the water-side inner substantially flat, sheet-type pile of said one of said multiple pairs.

11. The system according to claim 10, wherein the fill material is selected from the group consisting of sand, limestone, gravel, rock gravel and concrete gravel.

12. The system according to claim 1, further comprising: rip-rap placed adjacent to an outside sheet face of the water-side inner substantially flat, sheet-type pile of said one of said multiple pairs to protect against scour from tidal movement and/or from pumping operations.

13. The system according to claim 1, further comprising: an earthen support, placed adjacent to an outside face of the land-side outer substantially flat, sheet-type pile of said one of said multiple pairs, for strengthening the pair of substantially flat, sheet-type piles to resist transverse movement of the substantially flat, sheet-type piles of said one of said multiple pairs.

14. The system according to claim 13, further comprising erosion control matting placed over the earthen support.

15. The system according to claim 1, said multiple pairs of substantially flat, sheet-type piles are longitudinally abutted, welded, bolted, or interlocked or overlapped to form a continuous double-walled floodwall.

16. An apparatus for use in floodwalls, the apparatus comprising: a pair of substantially flat, sheet-type water-side inner and land-side outer piles with broad sheet faces of said pair parallel to each other and top and bottom ends, the substantially flat, sheet-type piles in the pair being spaced apart transversely and being oriented with the broad sheet faces parallel to each other; with the top ends of the inner and outer piles extending above the natural ground or soil to a height at least equal to the maximum anticipated height of the water, with the bottom end of the inner piles-driven deeper into the soil than the bottom end of the outer pile, the inner piles being supported solely by the cohesion of the soil, and the substantially flat, sheet-type piles in said pair being rigidly connected to develop, when an external force is applied to the sheet face of the water-side inner substantially flat, sheet-type pile of said pair, a force couple that places the water-side inner substantially flat, sheet-type piles of said pair in tension against the cohesion of the soil and the other land-side outer substantially flat, sheet-type pile of said pair in compression against the soil, when the rigidly connected substantially flat, sheet-type piles of said pair are in place in a floodwall.

17. The apparatus according to claim 16, wherein the substantially flat, sheet-type piles of said pair are rigidly connected together at or near their top ends.

18. A method of protecting against flooding due to rising water, and storm surge, the method comprising the acts of driving or placing multiple pairs of substantially flat, sheet-type water-side inner and land-side outer piles with broad sheet faces of each pair parallel to each other and top and bottom ends into natural ground or soil at or near an edge of an area to be protected from the rising water and storm surge so that a portion of the pairs of substantially flat, sheet-type piles extends above the surface of the natural ground or soil to a height at least equal to the maximum anticipated height of the water and storm surge, and the bottom ends of the inner piles are driven deeper into the natural ground or soil than the bottom ends of the outer piles, the inner piles being supported solely by the cohesion of the soil, the substantially flat, sheet-type piles in the pairs being spaced apart transversely and being oriented with the broad sheet faces of each pair parallel to each other, rigidly connecting the substantially flat, sheet-type piles in the pairs to develop, when an external force is applied to the broad sheet face of the water-side inner substantially flat, sheet-type piles of one of said multiple pairs, a force couple that places the water-side inner substantially flat, sheet-type piles of said one of said multiple piles in tension against the cohesion of the soil and the other land-side outer substantially flat, sheet-type pile of said one of said multiple piles in compression against the soil, thereby using the cohesion of the soil to the substantially flat, sheet-type piles to increase the resistance of the rigidly connected pair of substantially flat, sheet-type piles to transverse movement due to a horizontal force applied perpendicularly to the broad sheet face of the water-side inner substantially flat, sheet-type pile of said one of said multiple piles.

19. The method according to claim 18, further comprising the act of: filling the space between the substantially flat, sheet-type piles of each of said multiple pairs with material that further increases the resistance of the rigidly connected pair of substantially flat, sheet-type piles to transverse movement and impact due to the horizontal force applied perpendicularly to the sheet face of the water-side inner substantially flat, sheet-type pile of said one of said multiple piles.

* * * * *